US012746752B2

(12) United States Patent
Nagahashi

(10) Patent No.: US 12,746,752 B2
(45) Date of Patent: Sep. 29, 2026

(54) LIQUID DISCHARGE HEAD, LIQUID DISCHARGE APPARATUS, AND BONDED UNIT

(71) Applicant: Kazuto Nagahashi, Kanagawa (JP)

(72) Inventor: Kazuto Nagahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 155 days.

(21) Appl. No.: 18/637,454

(22) Filed: Apr. 17, 2024

(65) Prior Publication Data

US 2024/0351335 A1 Oct. 24, 2024

(30) Foreign Application Priority Data

Apr. 19, 2023 (JP) ................................ 2023-068510

(51) Int. Cl.
*B41J 2/14* (2006.01)
*B41J 2/16* (2006.01)

(52) U.S. Cl.
CPC ......... *B41J 2/1433* (2013.01); *B41J 2/14233* (2013.01); *B41J 2002/14362* (2013.01); *B41J 2/1623* (2013.01)

(58) Field of Classification Search
CPC .... B41J 2/1433; B41J 2/14233; B41J 2/1623; B41J 2/1621; B41J 2002/14362
See application file for complete search history.

(56) References Cited

U.S. PATENT DOCUMENTS

2006/0024477 A1 2/2006 Ito
2022/0288933 A1 9/2022 Shimofuku
2023/0138126 A1* 5/2023 Nagahashi ............ B41J 2/1433 347/20
2023/0294403 A1 9/2023 Nagahashi et al.

FOREIGN PATENT DOCUMENTS

JP H06226977 A * 8/1994
JP 2009-101645 A 5/2009
JP 2023-066904 A 5/2023

OTHER PUBLICATIONS

Extended European Search Report issued Aug. 26, 2024 in European Patent Application No. 24170027.7, 7 pages.
U.S. Appl. No. 18/499,661, filed Nov. 1, 2023.

* cited by examiner

*Primary Examiner* — Jason S Uhlenhake
(74) *Attorney, Agent, or Firm* — XSENSUS LLP

(57) ABSTRACT

A liquid discharge head includes a first component having a recess, recessed from a bonding face, at least in a bonding region and a second component bonded to the bonding face in the bonding region. The recess includes a first recess and a second recess. The first recess includes a first wall face and a second wall face. The second recess includes a third wall face connected to the first wall face at a first connection, and a fourth wall face connected to the second wall face at a second connection. At least one of the first connection or the second connection has a bending portion in which at least one of the third wall face or the fourth wall face is inclined with respect to the first wall face or the second wall face. The bending portion is disposed outside the bonding region of the first component.

20 Claims, 10 Drawing Sheets

COMPARATIVE EXAMPLE

COMPARATIVE EXAMPLE

LIQUID DISCHARGE HEAD, LIQUID DISCHARGE APPARATUS, AND BONDED UNIT

CROSS-REFERENCE TO RELATED APPLICATION

This patent application is based on and claims priority pursuant to 35 U.S.C. § 119(a) to Japanese Patent Application No. 2023-068510, filed on Apr. 19, 2023, in the Japan Patent Office, the entire disclosure of which is hereby incorporated by reference herein.

BACKGROUND

Technical Field

Embodiments of the present disclosure relate to a liquid discharge head, a liquid discharge apparatus, and a bonded unit.

Related Art

An inkjet image forming apparatus includes a liquid discharge head constructed of multiple components, such as a nozzle plate and a channel substrate, bonded to each other in layers.

SUMMARY

Embodiments of the present disclosure describe an improved liquid discharge head (bonded unit) that includes a first component having a recess, recessed from a bonding face, at least in a bonding region and a second component bonded to the bonding face in the bonding region of the first component. The recess includes a first recess to which an adhesive is applied and a second recess extending in an extending direction to connect the first recess and an outer peripheral end of the first component. The first recess includes a first wall face and a second wall face opposed to the first wall face. The second recess includes a third wall face connected to the first wall face at a first connection and a fourth wall face opposed to the third wall face and connected to the second wall face at a second connection. At least one of the first connection or the second connection has a bending portion in which at least one of the third wall face or the fourth wall face is inclined with respect to the first wall face or the second wall face. The bending portion is disposed outside the bonding region of the first component.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
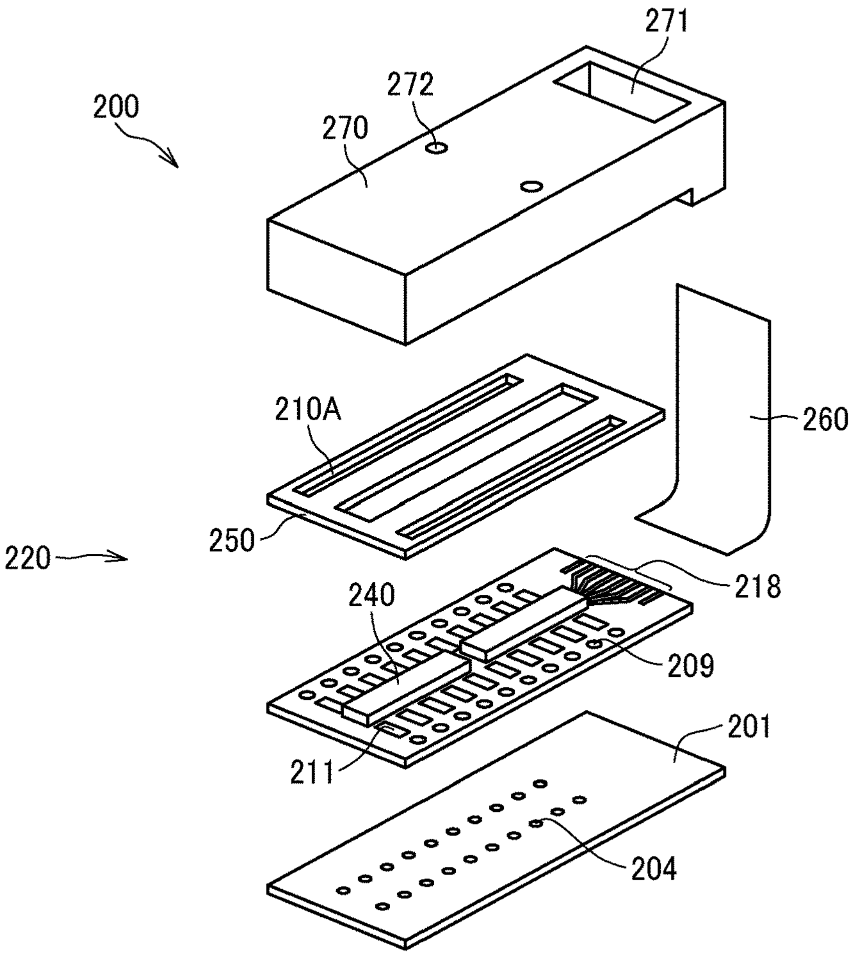
FIG. 1 is an exploded perspective view of a liquid discharge head according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Figure 2:
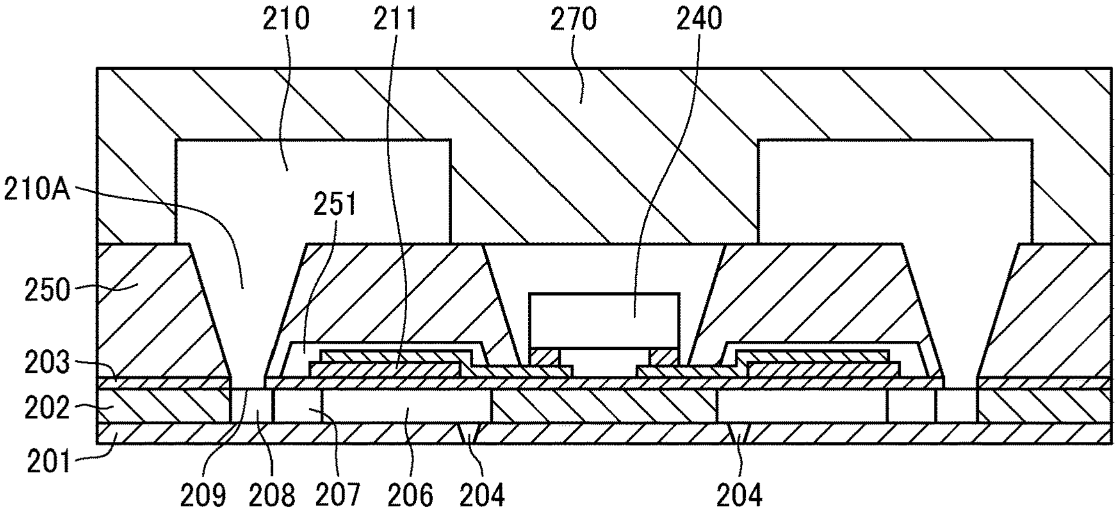
FIG. 2 is a cross-sectional view of the liquid discharge head of FIG. 1 in a direction orthogonal to a nozzle array direction.
Figure 3:
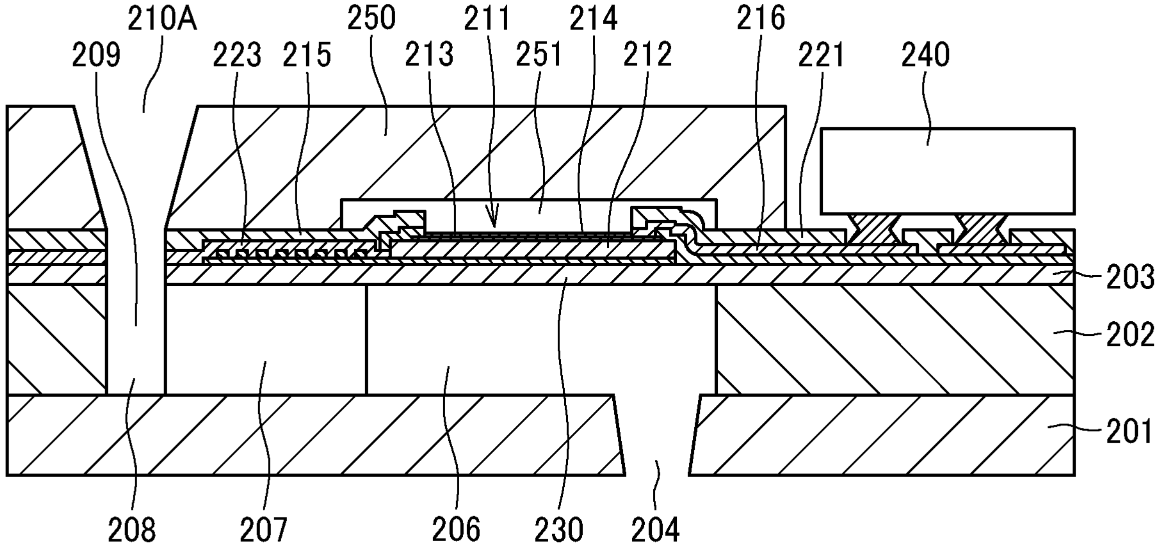
FIG. 3 is an enlarged view of a part of the liquid discharge head of FIG. 2.
Figure 4:
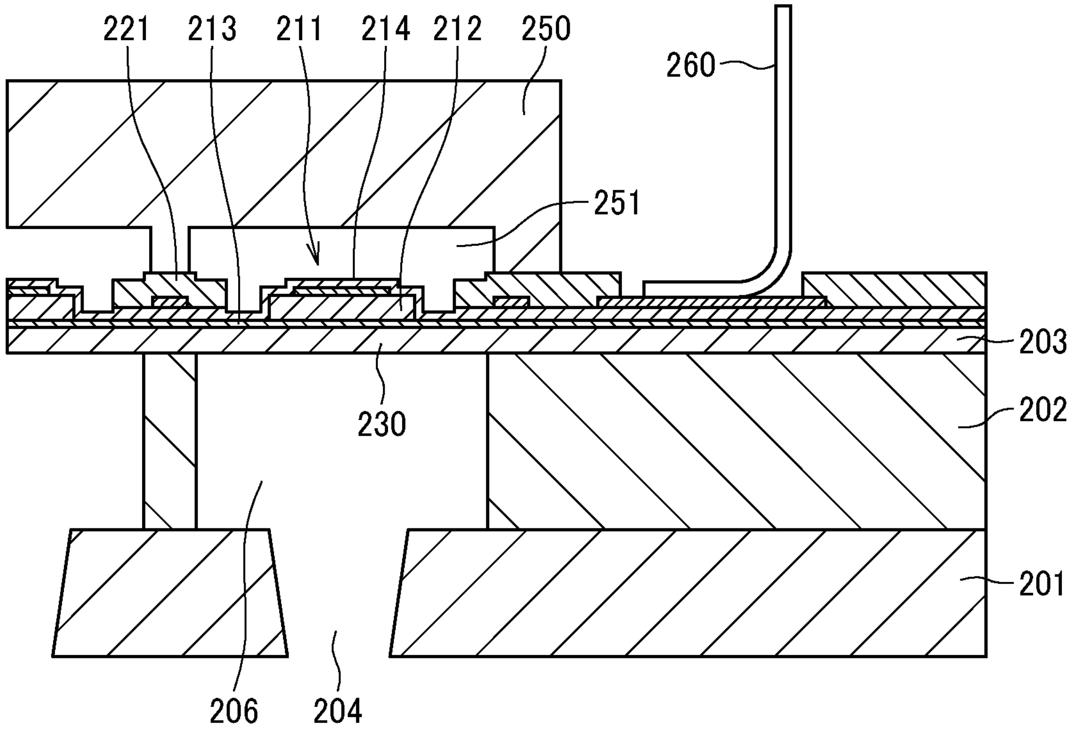
FIG. 4 is a cross-sectional view of the liquid discharge head of FIG. 1 in the nozzle array direction.

A liquid discharge head according to an embodiment of the present disclosure is described below with reference to FIGS. 1 to 4. In the drawings, like reference signs denote like elements, and overlapping descriptions may be simplified or omitted as appropriate. FIG. 1 is an exploded perspective view of the liquid discharge head according to the present embodiment. FIG. 2 is a cross-sectional view of the liquid discharge head of FIG. 1 taken in a direction orthogonal to a nozzle array direction in which nozzles are arrayed in a row. FIG. 3 is an enlarged cross-sectional view of a part of the liquid discharge head of FIG. 2. FIG. 4 is a cross-sectional view of a part of the liquid discharge head of FIG. 1 taken in the nozzle array direction.

As illustrated in FIGS. 1 and 2, a liquid discharge head 200 according to the present embodiment includes a nozzle plate 201, a channel substrate 202, a diaphragm plate 203, a piezoelectric element 211 as a pressure generator, a holding substrate 250, and a frame 270 also serving as a common-chamber substrate. The liquid discharge head 200 may be referred to simply as a head 200.

In the present embodiment, the channel substrate 202, the diaphragm plate 203, and the piezoelectric element 211 construct an "actuator substrate 220" as an actuator member according to the present embodiment. The actuator substrate 220 does not include the nozzle plate 201, the holding substrate 250, and the frame 270 that are bonded to the actuator substrate 220 after the actuator substrate 220 is formed as an independent component.

The nozzle plate 201 has a plurality of nozzles 204 to discharge liquid. In the present embodiment, the nozzle plate 201 has two nozzle rows, in each of which the nozzles 204 are arrayed in a row.

The channel substrate 202, together with the nozzle plate 201 and the diaphragm plate 203, defines an individual liquid chamber 206, a fluid restrictor 207, and a liquid inlet portion 208 as a passage of the liquid. The individual liquid chamber 206 communicates with the nozzle 204. The fluid restrictor 207 communicates with the individual liquid chamber 206. The liquid inlet portion 208 communicates with the fluid restrictor 207.

The liquid inlet portion 208 communicates with a common liquid chamber 210 defined by the frame 270 via a passage 209 and a flow path 210A. Liquid is supplied from the outside of the head 200 to the common liquid chamber 210 via a supply port 272. The passage 209 is a liquid supply inlet formed in the diaphragm plate 203, through which the liquid is supplied from the common liquid chamber 210 to the individual liquid chamber 206.

The flow path 210A is a part of the common liquid chamber 210 defined by the holding substrate 250.

As illustrated in FIGS. 3 and 4, the diaphragm plate 203 forms a deformable vibration portion 230 defining a part of the wall of the individual liquid chamber 206. The piezoelectric element 211 is disposed on the opposite face of the vibration portion 230 with respect to the individual liquid chamber 206. The piezoelectric element 211 is attached onto the face of the vibration portion 230 as a single unit. The vibration portion 230 and the piezoelectric element 211 construct a piezoelectric actuator.

The piezoelectric element 211 includes a lower electrode 213, a piezoelectric layer (piezoelectric body) 212, and an upper electrode 214 laminated in this order on the vibration portion 230. The piezoelectric element 211 is coated with an insulating film 221.

The lower electrode 213 as a common electrode for a plurality of piezoelectric elements 211 is connected to a common-electrode power-supply wiring pattern 223 via a common wire 215. The upper electrode 214 as an individual electrode for each piezoelectric element 211 is connected to a driver integrated circuit (IC) 240 via an individual wire 216.

The driver IC 240 is mounted on the actuator substrate 220 by, e.g., a flip-chip bonding, to cover an area between rows of the piezoelectric elements 211. As illustrated in FIG. 1, wires are led out from input/output (I/O) terminals, a power supply terminal, and an input terminal of drive waveforms (drive signals) of the driver IC 240 mounted on the actuator substrate 220 and connected to a connection terminal group 218.

Wires of a wiring member 260 such as a flexible printed circuit (FPC) or a flexible flat cable (FFC) are electrically connected to the respective connection terminals of the connection terminal group 218 by, for example, anisotropic conductive film (ACF) connection, solder connection, or wire bonding. The other ends of the wires of the wiring member 260 are connected to a controller installed in an apparatus body of a liquid discharge apparatus such as a printer 500 illustrated in FIG. 16.

The wiring member 260 is contained in the frame 270 and is led out to the outside of the head 200 through a wiring outlet 271. Each connection terminal of the connection terminal group 218 is flatly disposed at an end of the actuator substrate 220.

The holding substrate 250 is disposed on the actuator substrate 220. The holding substrate 250 has a recess (vibration chamber) 251 that accommodates the piezoelectric element 211. As described above, the holding substrate 250 defines the flow path 210A which is a part of the common liquid chamber 210. The holding substrate 250 is bonded to the diaphragm plate 203 of the actuator substrate 220 with an adhesive.

In the liquid discharge head 200 having the above-described configuration, the driver IC 240 applies a voltage between the upper electrode 214 and the lower electrode 213 of the piezoelectric element 211 to cause the piezoelectric layer 212 to expand in the direction of lamination of the electrodes, i.e., in the direction of the electric field, and to contract in the direction parallel to the vibration portion 230.

At that time, the lower electrode 213 is constrained by the vibration portion 230. For this reason, a tensile stress is generated at one side of the vibration portion 230 facing the lower electrode 213, causing the vibration portion 230 to bend toward the individual liquid chamber 206. Accordingly, liquid in the individual liquid chamber 206 is pressurized and discharged from the nozzle 204.

As described above, the nozzle plate 201, the channel substrate 202, the diaphragm plate 203, the holding substrate 250, and the frame 270 are laminated one on another and bonded to each other to construct the liquid discharge head 200. At the time of bonding, these components are temporarily bonded to each other with a light curable adhesive, and subsequently bonded to each other with a final bonding adhesive.

A description is given below of the above-described bonding, for example, the actuator substrate 220 as a first component (first bonding component) and the nozzle plate 201 as a second component (second bonding component) are bonded to each other.

Figure 5:
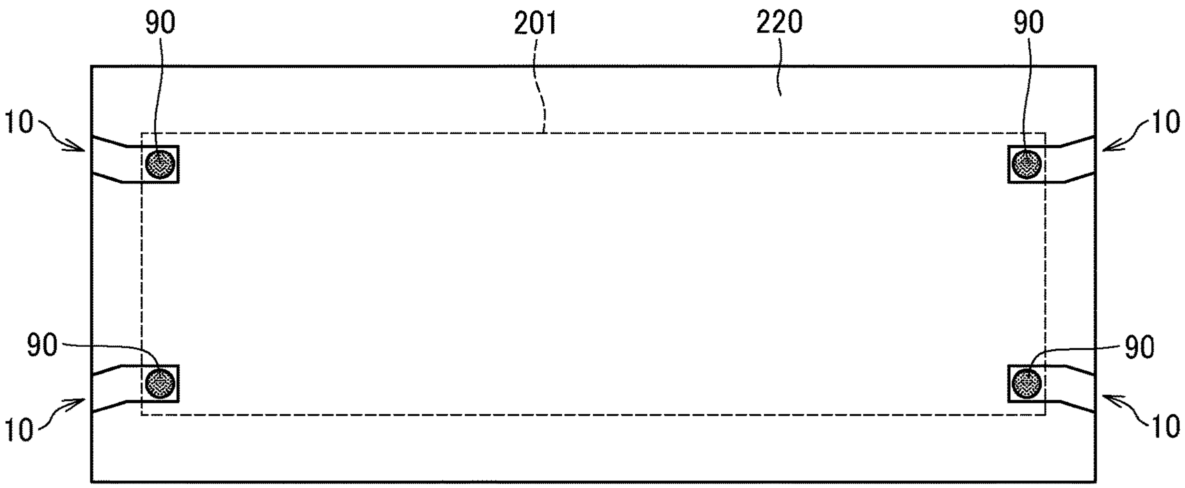
FIG. 5 is a plan view of a nozzle plate bonded to an actuator substrate of a liquid discharge head according to an embodiment of the present disclosure.

As illustrated in FIG. 5, the actuator substrate 220 is larger than the nozzle plate 201. The actuator substrate 220 has recesses 10 disposed at positions corresponding to four corners of the nozzle plate 201 on the face of the actuator substrate 220 facing the nozzle plate 201 to temporarily bond the nozzle plate 201 to the actuator substrate 220. In other words, the actuator substrate 220 has a bonding face to which the nozzle plate 201 is bonded, and the bonding face has the recesses 10. The bonding face is the surface of the channel substrate 202 of the actuator substrate 220 facing the nozzle plate 201 (see FIG. 2). An outer peripheral end of the actuator substrate 220 described later is an outer peripheral end of the channel substrate 202.

When the actuator substrate 220 and the nozzle plate 201 are bonded to each other, a temporary bonding adhesive 90 is applied to a first recessed portion of the recess 10, which is described later, and the final bonding adhesive is applied to a portion (i.e., a bonding region) of the actuator substrate 220 to which the nozzle plate 201 is adhered, i.e., a portion surrounded by a broken line in FIG. 5, excluding the recess 10. The temporary bonding adhesive 90 is a light curable adhesive that is cured by light such as ultraviolet (UV) light.

As the actuator substrate 220 and the nozzle plate 201 are bonded to each other, the temporary bonding adhesive 90 is held between the actuator substrate 220 and the nozzle plate 201 (see FIG. 7 described later). In this state, the recess 10 is irradiated with light to cure the temporary bonding adhesive 90. As a result, the actuator substrate 220 and the nozzle plate 201 are temporarily bonded to each other. Subsequently, these components (i.e., the actuator substrate 220 and the nozzle plate 201) are heated to cure the final bonding adhesive. As a result, the actuator substrate 220 and the nozzle plate 201 are permanently bonded to each other.

In the temporary bonding using the light curable temporary bonding adhesive 90, the temporary bonding adhesive 90 applied to the recess 10 may be squeezed out of the actuator substrate 220. In addition, the light may not sufficiently reach deep inside the recess 10, i.e., a far (inner) side from the outer peripheral end of the actuator substrate 220, causing insufficient temporary bonding.

The configuration of the recess 10 according to the present embodiment that solves the above situation is described below with reference to FIG. 6. In the present embodiment, since the recesses 10 at the four corners have the same shape, only the recess 10 at the upper right in FIG. 5 is described. The temporary bonding adhesive 90 is referred to simply as the adhesive 90 in the following description.

Figure 6:
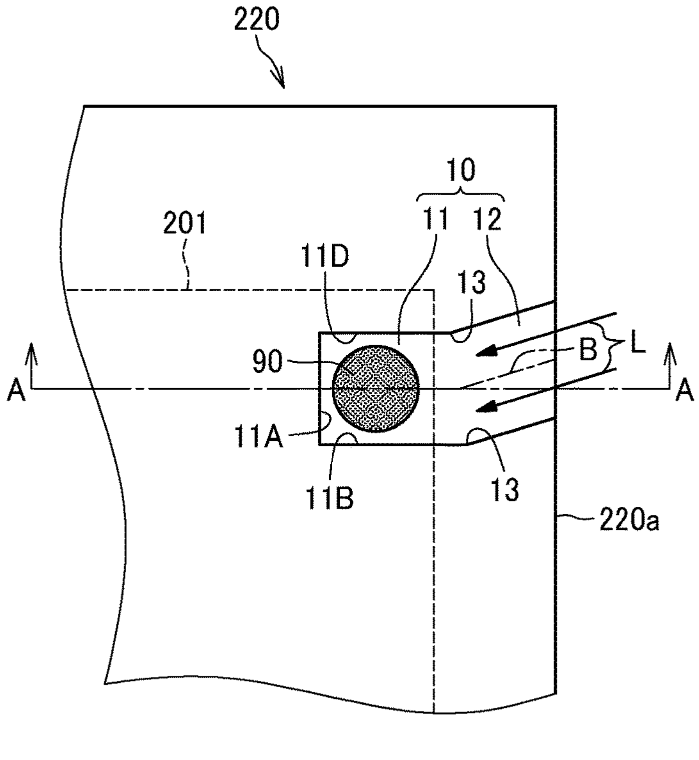
FIG. 6 is a plan view of a recess formed in an actuator substrate according to a first embodiment of the present disclosure.

As illustrated in FIG. 6, the recess 10 includes a first recessed portion 11 as a first recess and a second recessed portion 12 as a second recess. The adhesive 90 is applied to the first recessed portion 11 of the recess 10. The second recessed portion 12 communicates with the first recessed portion 11 and extends to an outer peripheral end 220*a* of the actuator substrate 220. In other words, the second recessed portion 12 is a portion of the recess 10 between the first recessed portion 11 and the outer peripheral end 220*a* to connect the first recessed portion 11 and the outer peripheral end 220*a*. The second recessed portion 12 is a passage for introducing a UV light L into the recess 10, and in the present embodiment, the width of the second recessed portion 12 is narrower than that of the first recessed portion 11.

As described above, the second recessed portion 12 serves as the light path, and the first recessed portion 11 to which the adhesive 90 is applied is farther from the outer peripheral end 220*a* than the second recessed portion 12. Accordingly, the adhesive 90 is prevented from being squeezed out of the outer peripheral end 220*a* of the actuator substrate 220.

The second recessed portion 12 extends in an extending direction inclined with respect to an inner side face (far side face) 11A of the first recessed portion 11. The term "the extending direction of the second recessed portion is inclined with respect to the inner side face 11A" means that a center line B of the second recessed portion 12 in a width direction forms an angle with the inner side face 11A, which is not orthogonal to the inner side face 11A of the first recessed portion 11 and not parallel to the inner side face 11A of the first recessed portion 11 in the present embodiment. Accordingly, the UV light L that enters the second recessed portion 12 is diffusely reflected in the first recessed portion 11, and the entire adhesive 90 can be more uniformly irradiated with the UV light L. Thus, the adhesive 90 is cured in the first recessed portion 11, and the actuator substrate 220 and the nozzle plate 201 can be temporarily bonded with preferable strength. The inner side face 11A is one of the side faces of the first recessed portion 11 on the side opposite to a portion communicating with the second recessed portion 12. In other words, the inner side face 11A is a surface farthest from the portion between the first recessed portion 11 and the second recessed portion 12 communicating with each other among the side faces defining the first recessed portion 11 in the present embodiment. The inner side face 11A is parallel to the outer peripheral end 220*a* of the actuator substrate 220.

As described above, the recess 10 according to the present embodiment prevents the adhesive 90 from being squeezed out and facilitates the sufficient cure of the adhesive 90 applied in the first recessed portion 11. As a result, as illustrated in FIG. 7, the actuator substrate 220 as the first component and the nozzle plate 201 as the second component are temporarily bonded to construct a bonded unit 290.

Figure 7:
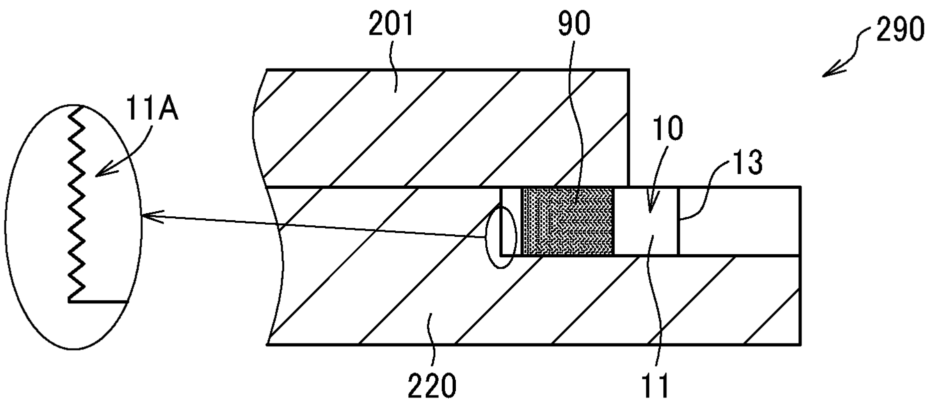
FIG. 7 is a cross-sectional view of the actuator substrate of FIG. 6 taken along line A-A in FIG. 6.

As illustrated in FIG. 7, the inner side face 11A has asperities which undulate in the vertical direction in FIG. 7. Accordingly, the UV light L can be further diffused in the first recessed portion 11. Alternatively, the inner side face 11A may have asperities which undulate in the width direction (the vertical direction in FIG. 6 and the direction orthogonal to the surface of the paper on which FIG. 7 is drawn), or other surfaces of the first recessed portion 11 and the second recessed portion 12 may have asperities. With such a configuration, light can be further diffused in the recess 10.

When the second recessed portion 12 is inclined with respect to the first recessed portion 11 as illustrated in FIG. 6, a bending portion 13 is formed at a boundary between a wall face defining the first recessed portion 11 and a wall face defining the second recessed portion 12. More specifically, the bending portion 13 is formed as a boundary between the inner side face (facing the first recessed portion 11) of the actuator substrate 220 defining the first recessed portion 11 and the inner side face (facing the second recessed portion 12) of the actuator substrate 220 defining the second recessed portion 12.

With such a configuration in which the bending portion as described above is formed in the first component, when the first component and the second component are bonded to each other, stress may be concentrated on a contact place of the second component with the bending portion, causing the second component to crack.

Figure 18:
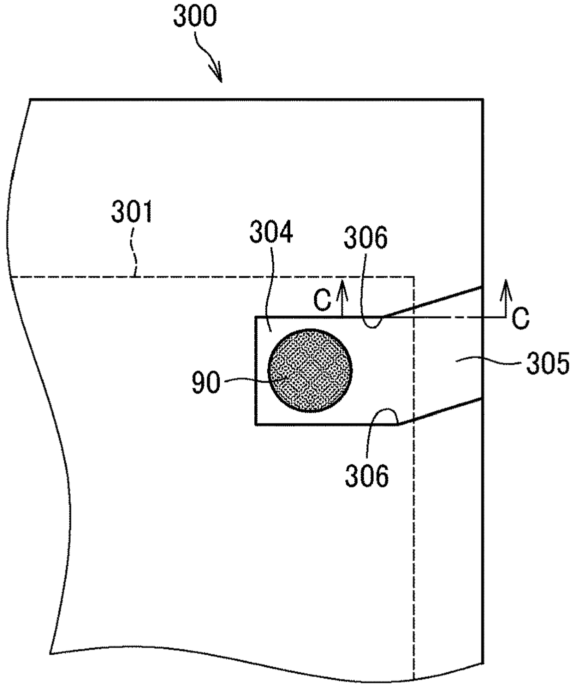
FIG. 18 is a plan view of a recess formed in an actuator substrate according to a comparative example.

For example, as a configuration according to a comparative example, an actuator substrate 300 illustrated in FIG. 18 is bonded to a nozzle plate 301 indicated by the dotted line in FIG. 18. In the actuator substrate 300, a bending portion 306 is formed at a boundary between a first recessed portion 304 and a second recessed portion 305.

Figure 19:
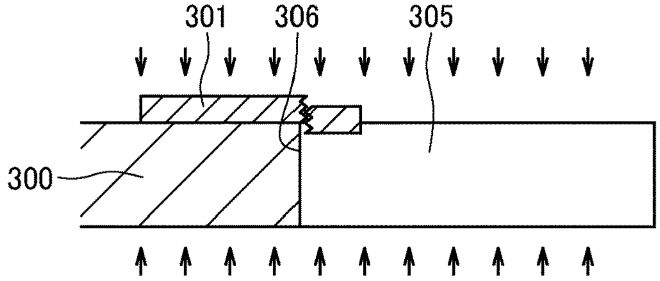
FIG. 19 is a cross-sectional view of the actuator substrate of FIG. 0.18 taken along line C-C in FIG. 18.

The comparative example is different from the present embodiment illustrated in FIG. 6 in that the bonding region between the actuator substrate 300 and the nozzle plate 301 includes the position of the bending portion 306 of the actuator substrate 300. With such a configuration, as illustrated in FIG. 19, when the actuator substrate 300 and the nozzle plate 301 are bonded to each other with pressure indicated by the arrows in FIG. 19, stress is concentrated on a contact position of the nozzle plate 301 with the bending portion 306 of the actuator substrate 300, causing the nozzle plate 301 to crack at this position.

By contrast, in the present embodiment, as illustrated in FIG. 6, the bending portion 13 is disposed outside the bonding region between the actuator substrate 220 and the nozzle plate 201. Such a configuration can prevent stress from concentrating on the portion of the nozzle plate 201 corresponding to the bending portion 13 of the wall faces of the recess 10 of the actuator substrate 220 when the actuator substrate 220 and the nozzle plate 201 are bonded to each other. Due to such a configuration, the damage, such as crack, of the nozzle plate 201 can be prevented when the actuator substrate 220 and the nozzle plate 201 are bonded.

Modifications of the recess 10 are described below. The description of the same points as those of the recess 10 described above will be omitted as appropriate.

Figure 8:
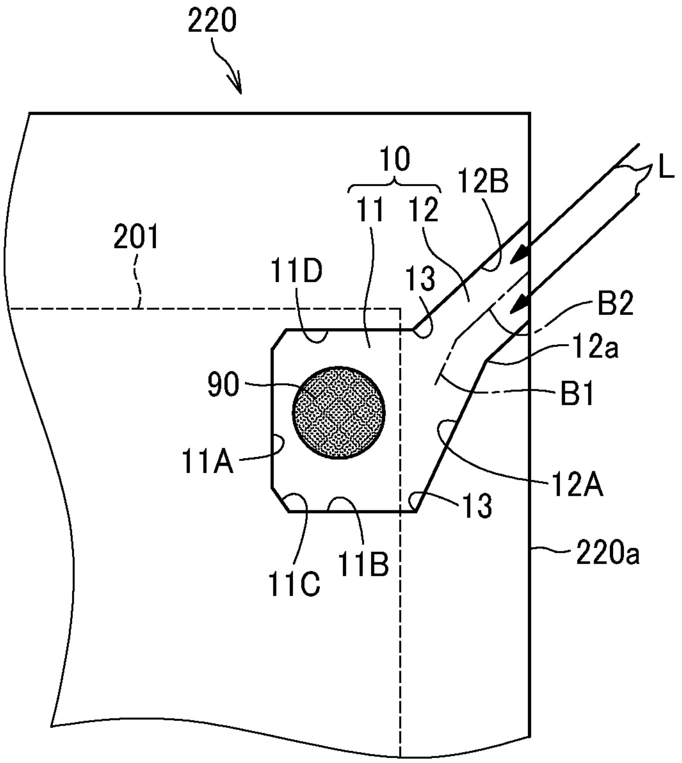
FIG. 8 is a plan view of a recess formed in an actuator substrate according to a second embodiment of the present disclosure.

As illustrated in FIG. 8, the recess 10 of the present embodiment is different from the above-described embodiment in that the extending direction of the second recessed portion 12 changes in the middle of the second recessed portion 12. Specifically, the extending direction of a center line B1 of the portion of the second recessed portion 12 adjacent to the first recessed portion 11 is different from the extending direction of a center line B2 of the portion of the second recessed portion 12 adjacent to the outer peripheral end 220*a*.

In the present embodiment, the term "the extending direction of the second recessed portion 12 is inclined with respect to the first recessed portion 11" means that, in particular, the center line B1, adjacent to the first recessed portion 11, of the second recessed portion 12 in the width direction forms an angle with the inner side face 11A, which is not orthogonal to the inner side face 11A and not parallel to the inner side face 11A. Alternatively, a face 11B disposed on a line extending from the center line B1 of the second recessed portion 12 may be defined as an inner side face, and the center line B1 or the center line B2 may be inclined with respect to the face 11B. Further, in the present embodiment, the extending directions of the center lines B1 and B2 of the second recessed portion 12 are inclined with respect to the outer peripheral end 220*a*.

The second recessed portion 12 is narrower adjacent to the outer peripheral end 220*a* of the actuator substrate 220 than adjacent to the first recessed portion 11 in the width direction of the second recessed portion 12. In other words, an inclination angle of a wall face 12A of the second recessed portion 12 on one side changes at an inflection point 12*a* as a boundary, so that the second recessed portion 12 is narrower in the width direction at a portion adjacent to the outer peripheral end 220*a* than at a portion adjacent to the first recessed portion 11. Thus, the configuration in which the width of the second recessed portion 12 gets narrow toward the outer peripheral end 220*a* further prevents the adhesive 90 from being squeezed. In addition, the configuration of the second recessed portion 12 that is wide adjacent to the first recessed portion 11 facilitates the diffusion of light that enters the second recessed portion 12 in the recess 10 to sufficiently cure the adhesive 90.

Further, the wall face 12A of the second recessed portion 12 on one side in the width direction deeply extends from the outer peripheral end 220*a* toward the first recessed portion 11 as compared with a wall face 12B on the other side. In other words, the wall face 12A deeply extending toward the first recessed portion 11 is longer than the wall face 12B by a certain distance. Thus, the wall face 12A on one side, which is longer than the wall face 12B, guides light incident from the second recessed portion 12 into the first recessed portion 11 along the wall face 12A to facilitate the curing of the adhesive 90 in the first recessed portion 11.

In the present embodiment, an inclined face 11C inclined with respect to the inner side face 11A is disposed between the inner side face 11A and the face 11B. The inclined face 11C is continuous with the inner side face 11A and the face 11B. In other words, the first recessed portion 11 has a shape such that a corner where the inner side face 11A and the face 11B intersect is chamfered by the inclined face 11C.

The inclined face 11C further diffuses the UV light L in the first recessed portion 11. Although the relation between the inner side face 11A and the face 11B has been described above, the inner side face 11A is also continuous with a face 11D via an inclined face on the other side. The faces 11B and 11D are continuous with the second recessed portion 12 (i.e., continuous faces).

The extending direction of the center line B1 or the extending direction of the center line B2 of the second recessed portion 12 is preferably inclined with respect to all side faces (i.e., the inner side face 11A, the face 11B, and the face 11D) of the first recessed portion 11. Thus, the UV light is diffusely reflected in the first recessed portion 11 to cure the adhesive 90 in the first recessed portion 11. All the side faces of the first recessed portion 11 described above do not include, for example, a narrow chamfered face in the corner between the inner side face 11A and the face 11B, such as the inclined face 11C described above. However, the extending direction of the center line B1 or B2 of the second recessed portion 12 may be inclined with respect to, for example, the inclined face 11C. The side faces of the first recessed portion 11 extend in a direction in which the first component and the second component are bonded to each other, i.e., in the direction orthogonal to the surface of the paper on which FIG. 8 is drawn. However, the direction may not be strictly orthogonal.

Figure 9:
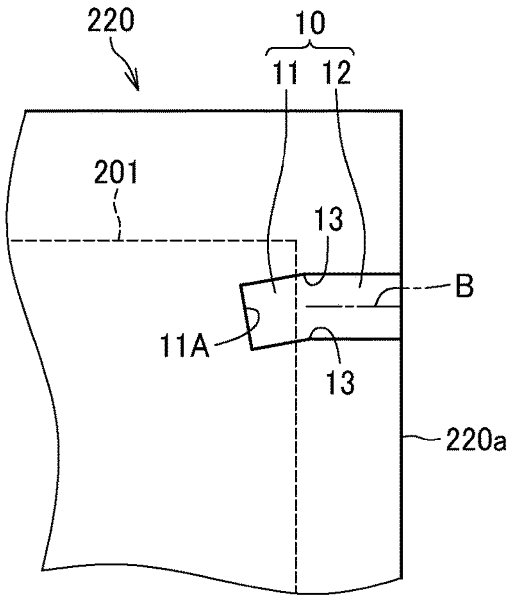
FIG. 9 is a plan view of a recess formed in an actuator substrate according to a third embodiment of the present disclosure.
Figure 10:
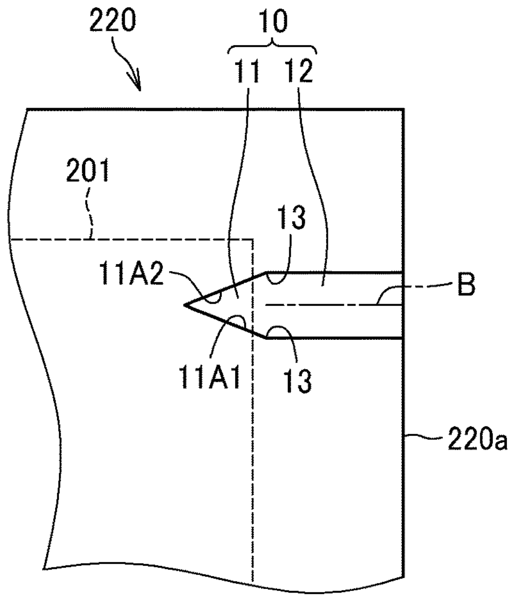
FIG. 10 is a plan view of a recess formed in an actuator substrate according to a fourth embodiment of the present disclosure.

In the recess 10 illustrated in FIG. 9, for example, an extending direction of the center line B of the second recessed portion 12 is substantially parallel to the outer peripheral end of the actuator substrate 220 extending in the left-and-right direction in FIG. 9 (and orthogonal to the outer peripheral end 220*a* of the actuator substrate 220). On the other hand, the first recessed portion 11 is inclined with respect to the outer peripheral end of the actuator substrate 220. As a result, the extending direction of the center line B of the second recessed portion 12 is inclined with respect to the inner side face 11A of the first recessed portion 11. The shape of the first recessed portion 11 is not limited to a rectangle, and as illustrated in FIG. 10, inner side faces 11A1 and 11A2 are inclined with respect to the outer peripheral end of the actuator substrate 220. As a result, the extending direction of the center line B of the second recessed portion 12 is inclined with respect to the inner side faces 11A1 and 11A2. In such a configuration, the inner side face 11A1 and the inner side face 11A2 are referred to as being opposed to each other.

Figure 11:
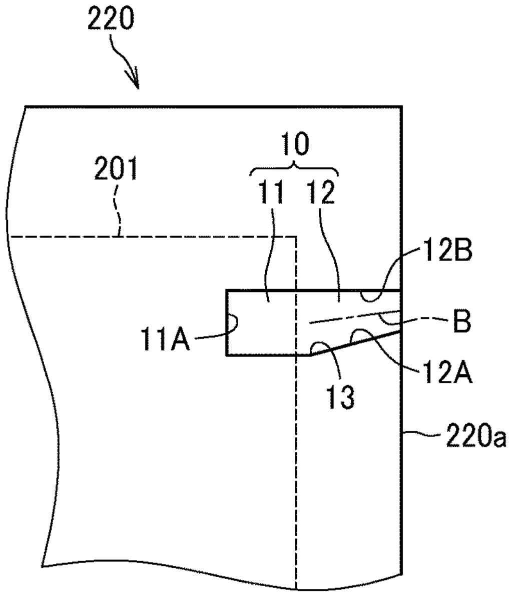
FIG. 11 is a plan view of a recess formed in an actuator substrate according to a fifth embodiment of the present disclosure.

In FIG. 11, the wall face 12A of the second recessed portion 12 on one side is inclined with respect to the inner side face 11A, but the wall face 12B on the other side is substantially orthogonal to the inner side face 11A. Also in this case, the extending direction of the center line B of the second recessed portion 12 is inclined with respect to the inner side face 11A. In such a configuration, the wall face 12A and the wall face 12B are referred to as being opposed to each other.

Also in the above embodiments, the configuration in which the extending direction of the center line B of the second recessed portion 12 is inclined with respect to the inner side face 11A facilitates the sufficient curing of the adhesive 90 applied to the first recessed portion 11.

Figure 12:
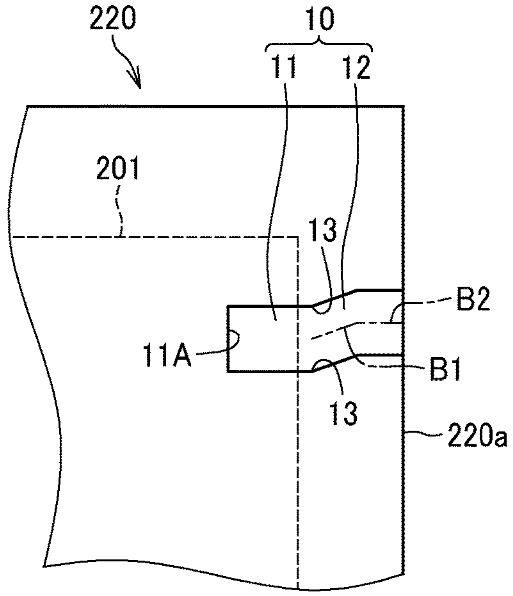
FIG. 12 is a plan view of a recess formed in an actuator substrate according to a sixth embodiment of the present disclosure.

The extending direction of the entire second recessed portion 12 is not necessarily inclined with respect to the inner side face 11A. For example, in FIG. 12, the extending direction of the center line B2 of the second recessed portion 12 adjacent to the outer peripheral end 220*a* is substantially orthogonal to the inner side face 11A, but the extending direction of the center line B1 of the second recessed portion 12 adjacent to the first recessed portion 11 is inclined with respect to the inner side face 11A. Accordingly, the adhesive 90 applied to the first recessed portion 11 can be sufficiently cured. In particular, the configuration in which the extending direction of the center line B1 of the second recessed portion 12 adjacent to the first recessed portion 11 is inclined with respect to the inner side face 11A is more effective in curing the adhesive 90 than the configuration in which the extending direction of the center line B2 is inclined with respect to the inner side face 11A.

The configurations of the recesses 10 illustrated in FIGS. 8 to 12 can be combined. For example, the first recessed portion 11 having the shape illustrated in FIG. 10 and the second recessed portion 12 illustrated in FIG. 12 may be combined.

In each of the embodiments of FIGS. 8 to 12, the bending portion 13 which is the boundary between the first recessed portion 11 and the second recessed portion 12 is disposed outside the bonding region with the nozzle plate 201. Such a configuration can prevent stress from concentrating on the portion of the nozzle plate 201 corresponding to the bending portion 13 of the wall faces of the recess 10 of the actuator substrate 220 when the actuator substrate 220 and the nozzle plate 201 are bonded to each other. Due to such a configuration, the damage, such as crack, of the nozzle plate 201 can be prevented when the actuator substrate 220 and the nozzle plate 201 are bonded. In the embodiment of FIG. 11, the wall face 12B of the second recessed portion 12 is parallel to (disposed in one straight line with) the face of the first recessed portion 11, and thus, a bending portion is not formed at the boundary on one side of the recess 10. However, the bending portion 13 is formed at the boundary between the wall face 12A of the second recessed portion 12 and the face of the first recessed portion 11 on the other side of the recess 10 outside the bonding region with the nozzle plate 201 to obtain a similar effect.

Figure 13:
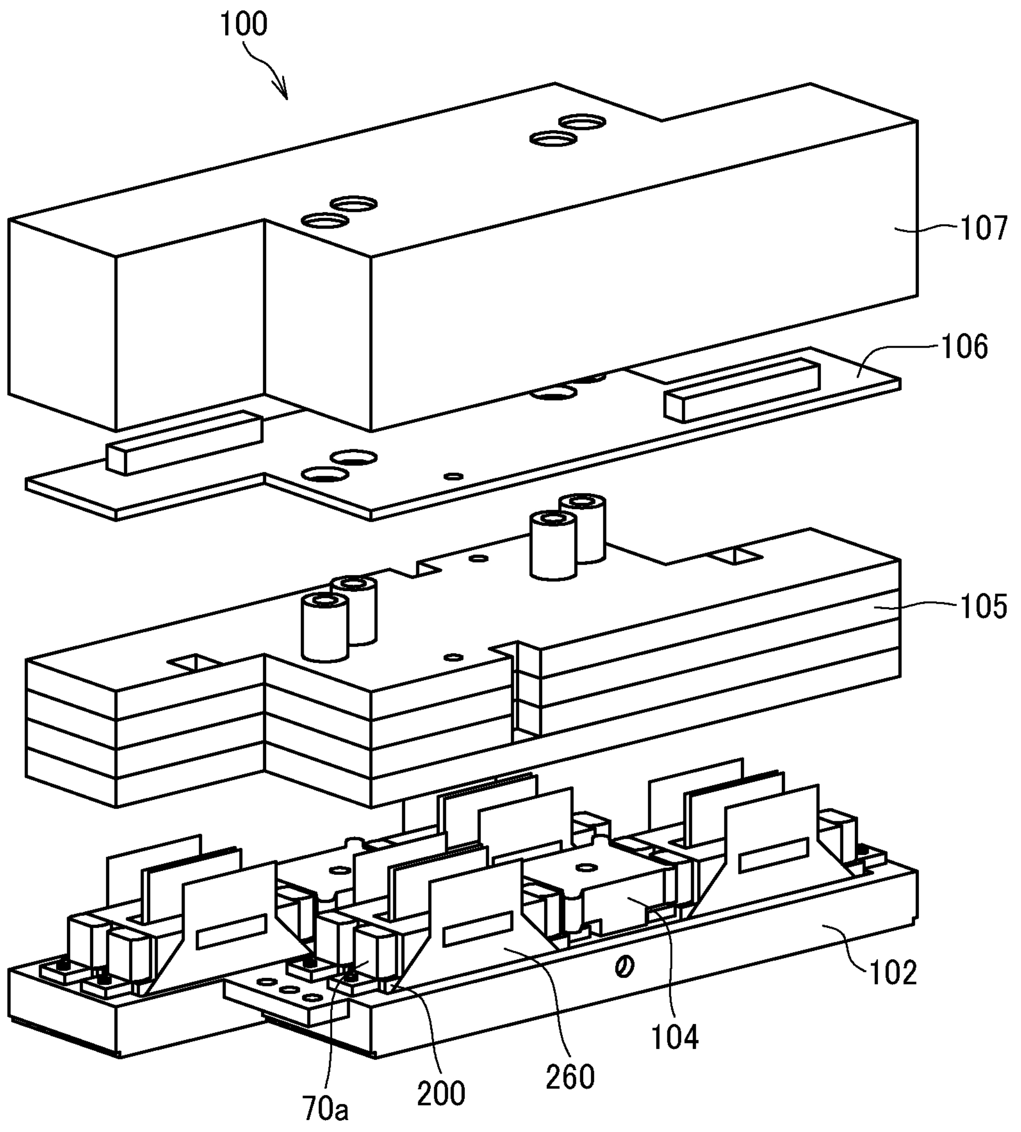
FIG. 13 is an exploded perspective view of a head module according to an embodiment of the disclosure.
Figure 14:
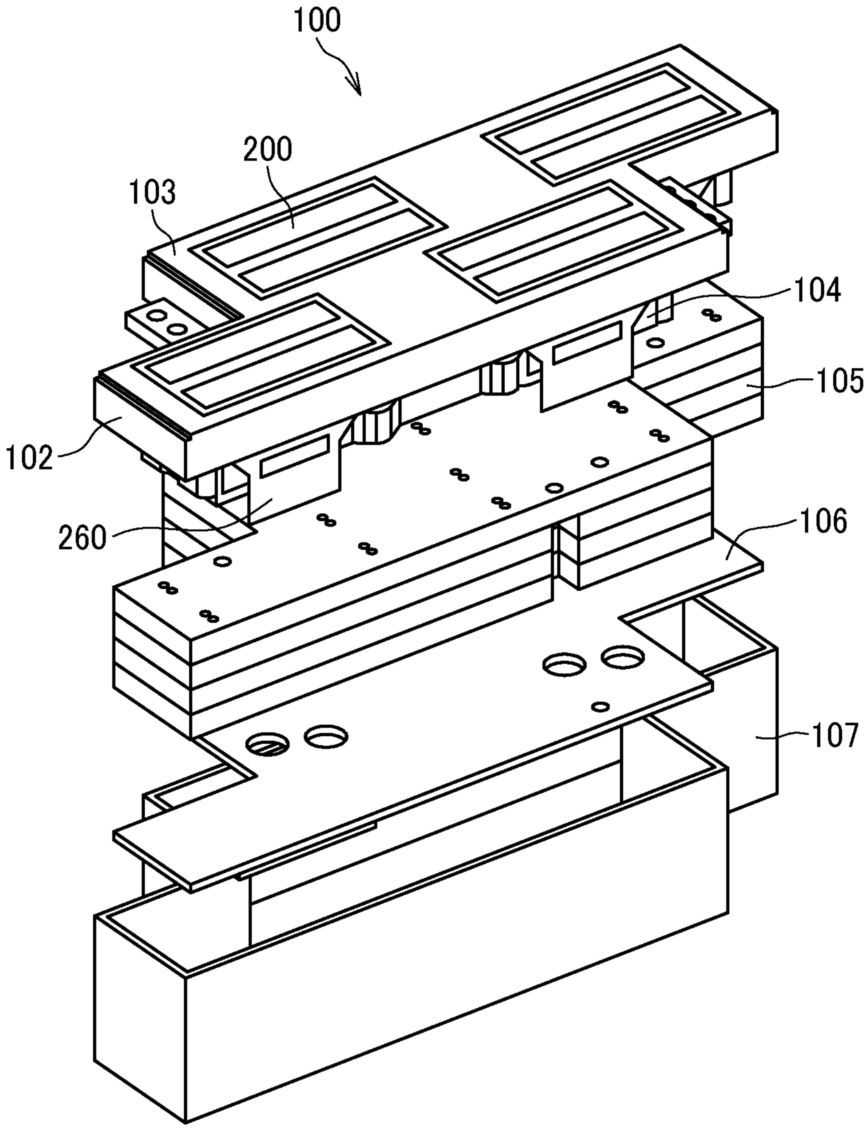
FIG. 14 is an exploded perspective view of the head module of FIG. 13 as viewed from a nozzle face side thereof.
Figure 15:
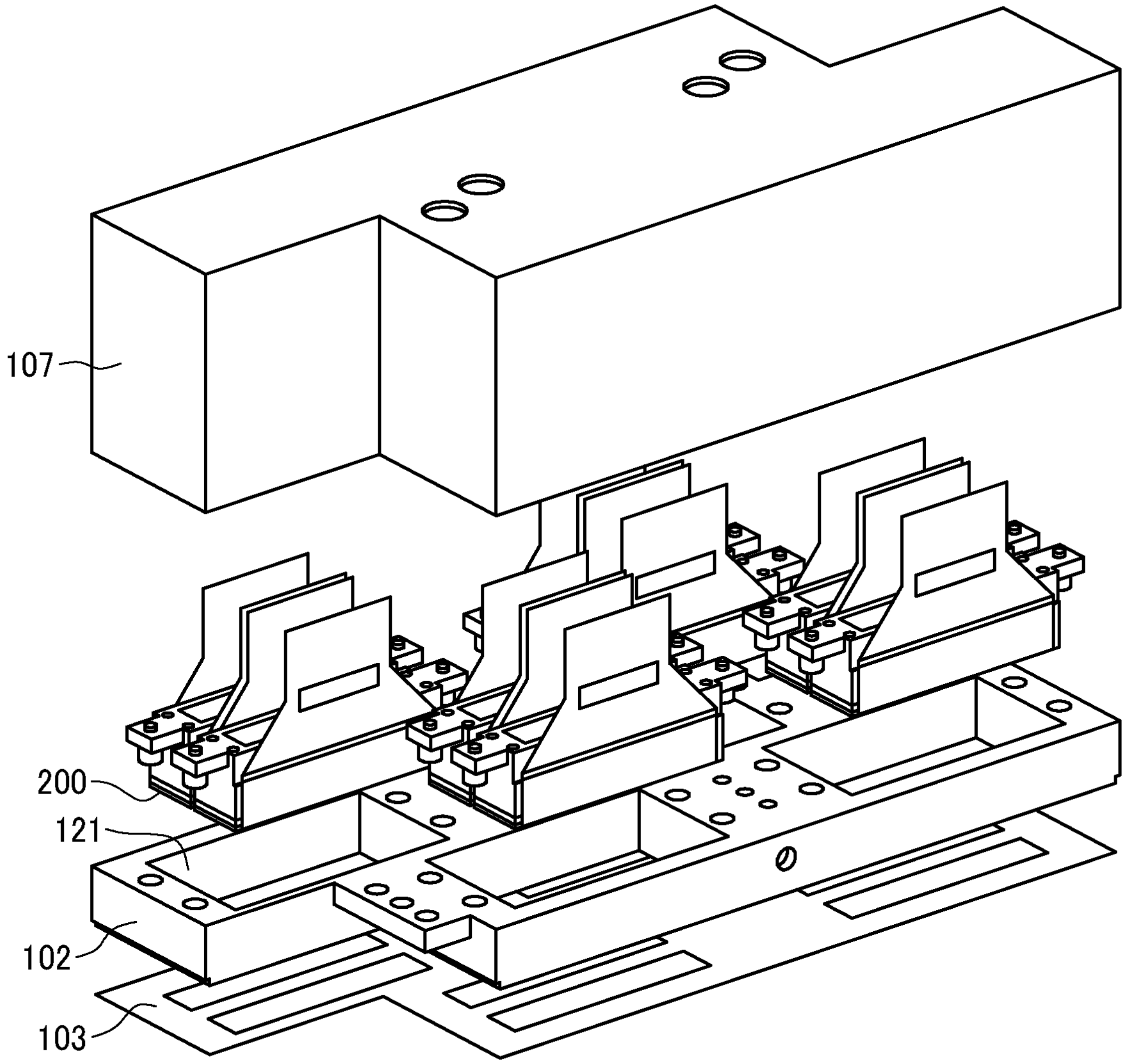
FIG. 15 is an exploded perspective view of a head, a base, and a cover of the head module of FIG. 13.

A head module 100 according to the present embodiment including the above-described liquid discharge head 200 is described below with reference to FIGS. 13 to 15. FIG. 13 is an exploded perspective view of the head module 100. FIG. 14 is an exploded perspective view of the head module 100 as viewed from the nozzle face side. FIG. 15 is an exploded perspective view of the heads 200, a base 102, and a cover 103 of the head module 100.

The head module 100 includes multiple heads 200 as the liquid discharge heads to discharge a liquid, the base 102, the cover 103, a heat radiator 104, a manifold 105, a printed circuit board (PCB) 106, and a module case 107. In the present embodiment, the head module 100 includes, for example, eight heads 200, but embodiments of the present disclosure are not limited thereto.

The PCB 106 and the piezoelectric element of the head 200 are connected via the wiring member 260 (e.g., a flexible wiring).

In the present embodiment, the multiple heads 200 are mounted with a space therebetween onto the base 102. The head 200 is inserted into an opening 121 in the base 102, and the peripheral end of the nozzle plate 201 of the head 200 is bonded to the cover 103 bonded and secured to the base 102 to attach the head 200 to the base 102. A flange 70*a* disposed outside the head 200 is bonded and secured to the base 102.

The head 200 is secured to the base 102 by, for example, bonding, swaging, riveting, or screwing, but a structure of securing the head 200 to the base 102 is not limited thereto.

Figure 16:
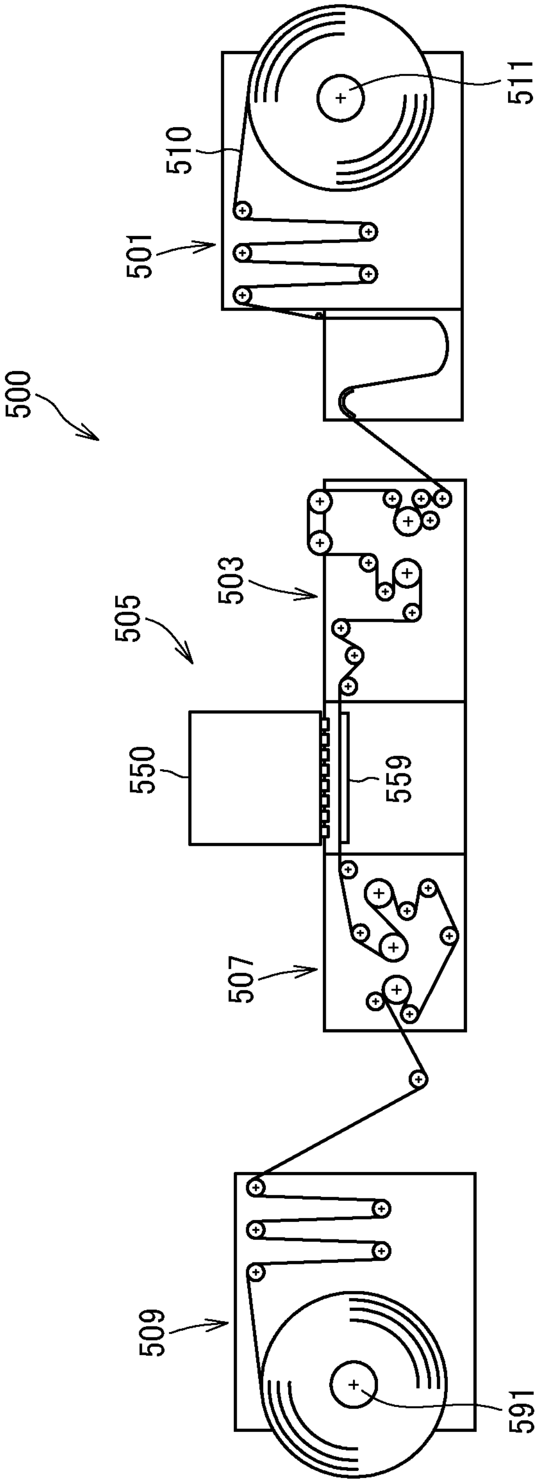
FIG. 16 is a schematic view of a liquid discharge apparatus according to an embodiment of the present disclosure.
Figure 17:
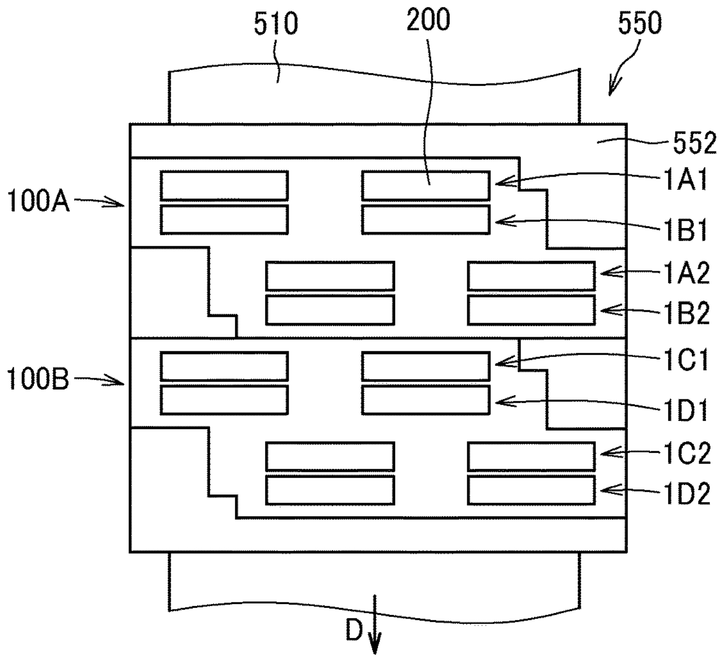
FIG. 17 is a plan view of a head unit of the liquid discharge apparatus of FIG. 16.

An example of a liquid discharge apparatus according to the present embodiment is described below with reference to FIGS. 16 and 17. FIG. 16 is a schematic view of the printer 500 according to the present embodiment. FIG. 17 is a plan view of the head unit 550 of the printer 500 of FIG. 16.

The printer 500 as a liquid discharge apparatus includes a loading device 501, a guide conveyor 503, a printing device 505, a drying device 507, and an ejection device 509. The loading device 501 carries a continuous medium 510 (i.e., a medium) such as continuous paper or a continuous sheet into the printer 500. The guide conveyor 503 guides and conveys the continuous medium 510 from the loading device 501 to the printing device 505. The printing device 505 discharges liquid onto the continuous medium 510 to form (print) an image. The drying device 507 dries the continuous medium 510. The ejection device 509 carries out the continuous medium 510.

The continuous medium 510 is fed from a winding roller 511 of the loading device 501 to the downstream side. Then, the continuous medium 510 is guided and conveyed with rollers of the loading device 501, the guide conveyor 503, the drying device 507, and the ejection device 509 (which are collectively referred to as a conveyor), and wound around a take-up roller 591 of the ejection device 509.

In the printing device 505, the continuous medium 510 is conveyed on a conveyance guide 559 so as to face a head unit 550. The head unit 550 discharges a liquid onto the continuous medium 510 to form an image.

As illustrated in FIG. 17, the head unit 550 includes two head modules 100A and 100B according to the present embodiment on a common base 552.

The head module 100A includes head arrays 1A1, 1A2, 1B1, and 1B2. Each of the head arrays 1A1, 1A2, 1B1, and 1B2 includes multiple liquid discharge heads 200 (two heads 200 in the present embodiment) arranged in a head array direction orthogonal to a conveyance direction of the continuous medium 510 indicated by arrow D in FIG. 17. The head module 100B includes head arrays 1C1, 1C2, 1D1, and 1D2. Each of the head arrays 1C1, 1C2, 1D1, and 1D2 includes multiple liquid discharge heads 200 arranged in the head array direction orthogonal to the conveyance direction of the continuous medium 510. The head arrays 1A1 and 1A2 of the head module 100A discharge a liquid of the same color. Similarly, the head arrays 1B1 and 1B2 of the head module 100A are grouped as one set and discharge a liquid of the same desired color. The head arrays 1C1 and 1C2 of the head module 100B are grouped as one set and discharge a liquid of the same desired color. The head arrays 1D1 and 1D2 of the head module 100B are grouped as one set and discharge a liquid of the same desired color.

The head module according to the present embodiment can be formed together with functional parts and mechanisms as a single unit (integrated unit) to construct a liquid discharge unit. For example, the head module may be combined with at least one of the configurations of a head tank, a carriage, a supply unit, a maintenance unit, a main scanning moving unit, or a liquid circulation device.

Examples of the "single unit" include a combined unit in which the head module and one or more functional parts and mechanisms are secured to each other through, e.g., fastening, bonding, or engaging, and a combined unit in which one of the head module and the functional parts and mechanisms is movably held by another. Further, the head module, and the functional parts and mechanisms may be detachably attached to each other.

The term "liquid discharge apparatus" used in the present embodiment includes an apparatus including the head module or a liquid discharge unit to drive the liquid discharge head to discharge liquid. The term "liquid discharge apparatus" used herein includes, in addition to apparatuses to discharge liquid to a medium onto which liquid can adhere, apparatuses to discharge the liquid into gas (air) or a different liquid.

For example, the "liquid discharge apparatus" may further include devices relating to feeding, conveying, and ejecting of the medium onto which liquid can adhere and also include a pretreatment device and an aftertreatment device.

The "liquid discharge apparatus" may be, for example, an image forming apparatus to form an image on a sheet by discharging ink, or a three-dimensional fabrication apparatus to discharge fabrication liquid to a powder layer in which powder material is formed in layers to form a three-dimensional object.

The "liquid discharge apparatus" is not limited to an apparatus that discharges liquid to visualize meaningful images such as characters or figures. For example, the liquid discharge apparatus may be an apparatus that forms patterns having no meaning or an apparatus that fabricates three-dimensional images.

The above-described term "medium onto which liquid can adhere" represents a medium on which liquid is at least temporarily adhered, a medium on which liquid is adhered and fixed, or a medium into which liquid adheres and permeates. Specific examples of the "medium onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "medium onto which liquid can adhere" includes any medium to which liquid adheres, unless otherwise specified.

Examples of materials of the "medium onto which liquid can adhere" include any materials to which liquid can adhere even temporarily, such as paper, thread, fiber, fabric, leather, metal, plastic, glass, wood, and ceramic.

The term "liquid discharge apparatus" may be an apparatus in which the liquid discharge head and the medium onto which liquid can adhere move relative to each other. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particle of the raw material.

Liquid to be discharged through the nozzles of the liquid discharge head is not limited to a particular liquid as long as the liquid has a viscosity or surface tension to be discharged from the liquid discharge head. However, preferably, the viscosity of the liquid is not greater than 30 millipascal-second (mPa-s) under ordinary temperature and ordinary pressure or by heating or cooling. Examples of the liquid to be discharged include a solution, a suspension, or an emulsion including, for example, a solvent, such as water or an organic solvent; a colorant, such as dye or pigment; a functional material, such as a polymerizable compound, a resin, or a surfactant; a biocompatible material, such as deoxyribonucleic acid (DNA), amino acid, protein, or calcium; and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

Examples of an energy source for generating energy to discharge liquid include a piezoelectric actuator (a laminated piezoelectric element or a thin-film piezoelectric element), a thermal actuator that employs a thermoelectric transducer element, such as a thermal resistor, and an electrostatic actuator including a diaphragm and opposed electrodes.

The terms "image formation," "recording," "printing," "image printing," and "fabricating" used herein may be used synonymously with each other.

Although the several embodiments of the present disclosure have been described above, embodiments of the present disclosure are not limited to the embodiments described above, and various modifications and changes can be made without departing from the scope of the present disclosure.

In the above-described embodiments, examples of the first component and the second component of the liquid discharge head are the actuator substrate 220 and the nozzle plate 201, respectively, but embodiments of the present disclosure are not limited thereto. Examples of the first component and the second component include a channel substrate, a diaphragm plate, a common-chamber substrate, a frame, and other components of the liquid discharge head to be bonded to each other. Further, embodiments of the present disclosure are not limited to the liquid discharge head in which the first component and the second component are bonded to each other, and can be applied to a bonded unit other than the liquid discharge head, in which a first component and a second component are bonded to each other.

In the above-described embodiment, the recess is disposed only on the first component, but the recess may be disposed on both the first component and the second component.

Aspects of the present disclosure are, for example, as follows.

Aspect 1

A liquid discharge head includes a first component (first bonding component) and a second component (second bonding component) bonded to each other. The first component is provided with a recess in a bonding face with the second component. The recess includes a first portion to which an adhesive is applied and a second portion communicating with the first portion and extending to an outer peripheral end of the first component. A bending portion is a boundary portion between a wall face of the first component forming the first portion and a wall face of the first component forming the second portion. The bending portion is disposed outside a bonding region of the first component to which the second component is bonded.

In other words, a liquid discharge head includes a first component having a recess, recessed from a bonding face, at least in a bonding region and a second component bonded to the bonding face in the bonding region of the first component. The recess includes a first recess to which an adhesive is applied and a second recess extending in an extending direction to connect the first recess and an outer peripheral end of the first component. The first recess includes a first wall face and a second wall face opposed to the first wall face. The second recess includes a third wall face connected to the first wall face at a first connection and a fourth wall face opposed to the third wall face and connected to the second wall face at a second connection. At least one of the first connection or the second connection has a bending portion in which at least one of the third wall face or the fourth wall face is inclined with respect to the first wall face or the second wall face. The bending portion is disposed outside the bonding region of the first component.

Aspect 2

In the liquid discharge head according to Aspect 1, the second recess has a width on the outer peripheral end side narrower than a width on the first portion side.

In other words, the second recess has an outer part having a first width in a width direction orthogonal to the extending direction and is closer to the outer peripheral end than the first recess, and an inner part having a second width wider than the first width, and is closer to the first recess than the outer part.

Aspect 3

In the liquid discharge head according to Aspect 1 or 2, the second portion has the wall face, on one side in a width direction, extending longer than the wall face on the other side toward the first portion side.

In other words, the third wall face and the fourth wall face extend from the outer peripheral end toward the first recess, and the third wall face is longer than the fourth wall face in the extending direction.

Aspect 4

In the liquid discharge head according to any one of Aspects 1 to 3, a far side face of the first portion is connected to, via an inclined face inclined with respect to the far side face, a continuous face continuous with the inclined face, and the continuous face is connected to the second portion.

In other words, the first recess further includes a fifth wall face between the first wall face and the second wall face and an inclined face between the first wall face and the fifth wall face to connect the first wall face and the fifth wall face. The inclined face is inclined with respect to each of the first wall face and the fifth wall face.

Aspect 5

In the liquid discharge head according to any one of Aspects 1 to 4, at least one of the wall faces of the first portion or the second portion has asperities.

In other words, the first recess further includes a fifth wall face between the first wall face and the second wall face. At least one of the first wall face, the second wall face, the third wall face, the fourth wall face, or the fifth wall face has asperities.

Aspect 6

A liquid discharge apparatus includes the liquid discharge head according to any one of Aspects 1 to 5.

In other words, a liquid discharge apparatus includes the liquid discharge head according to any one of Aspects 1 to 5, to discharge a liquid to a medium, and a conveyor to convey the medium to a position facing the liquid discharge head.

Aspect 7

A bonded unit includes a first component (first bonding component) and a second component (second bonding component) bonded to each other. The first component is provided with a recess in a bonding face with the second component. The recess includes a first portion to which an adhesive is applied and a second portion communicating with the first portion and extending to an outer peripheral end of the first component. A bending portion is a wall face portion of the first component forming the recess and a boundary portion between the first portion and the second portion. The bending portion is disposed outside a bonding region of the first component to which the second component is bonded.

In other words, a bonded unit includes a first component having a recess, recessed from a bonding face, at least in a bonding region and a second component bonded to the bonding face in the bonding region of the first component. The recess includes a first recess to which an adhesive is applied and a second recess extending in an extending direction to connect the first recess and an outer peripheral end of the first component. The first recess includes a first wall face and a second wall face opposed to the first wall face. The second recess includes a third wall face connected to the first wall face at a first connection and a fourth wall face opposed to the third wall face and connected to the second wall face at a second connection. At least one of the first connection or the second connection has a bending portion in which at least one of the third wall face or the fourth wall face is inclined with respect to the first wall face or the second wall face. The bending portion is disposed outside the bonding region of the first component.

According to one aspect of the present disclosure, stress concentration on the components can be prevented when the components are bonded to each other.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a first component having a recess, recessed from a bonding face, at least in a bonding region; and a second component bonded to the bonding face in the bonding region of the first component, wherein the recess includes:

a first recess to which an adhesive is applied, the first recess including:

a first wall face; and a second wall face opposed to the first wall face; and a second recess extending in an extending direction to connect the first recess and an outer peripheral end of the first component, the second recess including:

a third wall face connected to the first wall face at a first connection; and a fourth wall face opposed to the third wall face and connected to the second wall face at a second connection, wherein:

at least one of the first connection or the second connection has a bending portion in which at least one of the third wall face or the fourth wall face is inclined with respect to the first wall face or the second wall face, the bending portion is disposed outside the bonding region of the first component, the bonding region includes an area where the first component and the second component are adhered to each other using the adhesive, and the bonding region excludes areas where the first component and the second component are not adhered to each other using the adhesive.

2. The liquid discharge head according to claim 1, wherein the second recess includes:
an outer part:
having a first width in a width direction orthogonal to the extending direction; and
which is closer to the outer peripheral end than the first recess; and
an inner part:
having a second width wider than the first width; and
which is closer to the first recess than the outer part.

3. The liquid discharge head according to claim 1, wherein:
the third wall face and the fourth wall face extend from the outer peripheral end toward the first recess, and
the third wall face is longer than the fourth wall face in the extending direction.

4. The liquid discharge head according to claim 1, wherein;
the first recess further includes:
a fifth wall face between the first wall face and the second wall face; and
an inclined face between the first wall face and the fifth wall face to connect the first wall face and the fifth wall face, and
the inclined face is inclined with respect to each of the first wall face and the fifth wall face.

5. The liquid discharge head according to claim 4, wherein:
the extending direction of the second recess is inclined with respect to the inclined face.

6. The liquid discharge head according to claim 1, wherein:
the first recess further includes a fifth wall face between the first wall face and the second wall face, and
at least one of the first wall face, the second wall face, the third wall face, the fourth wall face, or the fifth wall face has asperities.

7. A liquid discharge apparatus comprising:
the liquid discharge head according to claim 1, to discharge a liquid to a medium, and
a conveyor to convey the medium to a position facing the liquid discharge head.

8. The liquid discharge head according to claim 7, wherein:
the conveyor includes a winding roller and a take-up roller.

9. The liquid discharge head according to claim 1, wherein:
the first component comprises an actuator substrate, and
the second component comprises a nozzle plate.

10. The liquid discharge head according to claim 9, wherein:
the actuator substrate includes a channel substrate, a diaphragm plate, and a pressure generator.

11. The liquid discharge head according to claim 10, wherein:
the pressure generator includes a piezoelectric element.

12. The liquid discharge head according to claim 1, wherein:
an inner side face of the first recess is parallel to the outer peripheral end of the first component.

13. The liquid discharge head according to claim 1, wherein:
a width of the second recess is narrower than a width of the first recess.

14. The liquid discharge head according to claim 1, wherein:
the first component includes a plurality of recesses disposed at positions corresponding to four corners of the second component.

15. The liquid discharge head according to claim 1, wherein:
the third wall face of the second recess includes an inflection point at which an inclination angle of the third wall face changes.

16. The liquid discharge head according to claim 1, wherein:
the adhesive is a light-curable adhesive.

17. The liquid discharge head according to claim 1, wherein:
the first recess is farther from the outer peripheral end of the first component than the second recess.

18. A head module comprising:
a plurality of liquid discharge heads according to claim 1; and
a base onto which the plurality of liquid discharge heads are mounted.

19. The head module according to claim 18, further comprising:
a cover bonded to the base,
wherein a peripheral end of the second component of each liquid discharge head is bonded to the cover.

20. A bonded unit comprising:
a first component having a recess, recessed from a bonding face, at least in a bonding region; and
a second component bonded to the bonding face in the bonding region of the first component,
wherein the recess includes:
a first recess to which an adhesive is applied, the first recess including:
a first wall face; and
a second wall face opposed to the first wall face; and
a second recess extending in an extending direction to connect the first recess and an outer peripheral end of the first component, the second recess including:
a third wall face connected to the first wall face at a first connection; and
a fourth wall face opposed to the third wall face and connected to the second wall face at a second connection,
wherein:
at least one of the first connection or the second connection has a bending portion in which at least one of the third wall face or the fourth wall face is inclined with respect to the first wall face or the second wall face,
the bending portion is disposed outside the bonding region of the first component,
the bonding region includes an area where the first component and the second component are adhered to each other using the adhesive, and
the bonding region excludes areas where the first component and the second component are not adhered to each other using the adhesive.

* * * * *